United States Patent Office 3,284,443
Patented Nov. 8, 1966

3,284,443
STARCH-PHOSPHATE REACTION PRODUCTS AND METHOD OF MAKING SAME
Julian A. Hay, Gary, Ind., and Forrest J. Mork, Calumet City, Ill., assignors to American Maize-Products Company, a corporation of Maine
Filed Apr. 17, 1963, Ser. No. 273,777
9 Claims. (Cl. 260—233.5)

This invention relates to a novel method of reacting starch with inorganic phosphate salts and to the reaction products so obtained.

The preparation of certain relatively new forms of modified starches which have been reacted with alkali metal phosphate salts is described in U.S. Patents 2,884,412 and 2,865,762. The processes of these patents generally involve impregnating starch granules with alkali metal phosphates, drying the granules without gelatinizing them to a moisture content of less than 20%, and then heating the dry granules to reaction temperatures of about 120 to 175° C.

Heretofore, such a reaction has been carried out on a commercial scale by mixing starch granules with phosphate salts in aqueous solution, drying the granules to reduce the water content thereof to 20% or less and then heating a bed of granules to reaction temperature in vertical or horizontal vessels while the granules are mechanically agitated as by paddles, or blades. The products thus obtained can be dissolved in water to form clear, viscous solutions having a desirably low solids-to-viscosity ratio. However, due to difficulties in controlling temperature over the entire course of the reaction, starch phosphate products prepared in conventional manner often are of poor color and contain small amounts of dextrinized starch fragments. The latter phenomenon is particularly objectionable since the dextrinized starch fragments reduce the viscosity of the starch phosphate solutions and thereby increase the solids-to-viscosity ratio which should be kept as low as possible.

We have now discovered that when a stream of hot inert gas is passed through starch granules, containing inorganic phosphate salts and not more than 20% moisture, at a velocity sufficient to fluidize the granules and heat them to reaction temperatures, the reaction between the starch and phosphate salt proceeds in some new manner to yield starch phosphate reaction products having entirely new and different characteristics. More specifically, the maximum viscosity that has been previously obtainable with an aqueous solution containing 5% starch phosphate of conventional manufacture has ranged from 30,000 to 40,000 c.p.s. We have unexpectedly found that aqueous solutions containing 5% of starch phosphate produced in accordance with the method of this invention have a viscosity close to 100,000 c.p.s. Thus, by use of our new process, the solids-to-viscosity ratio of aqueous starch phosphate solutions may be reduced quite substantially to desirable, low values. Furthermore, there is no significant problem of poor color or other adverse effects customarily experienced with conventional methods of manufacture when starch phosphates are made in accordance with our new process.

Briefly described, the process of the invention involves the steps of forming a bed of starch granules which have been impregnated in conventional manner with an inorganic phosphate salt and which contain not more than 20% moisture by weight, and then passing a hot inert gas through the granules at a rate sufficient to fluidize the bed and heat the granules thereof to a temperature of from about 300° to about 375° F., and maintaining the granules in the fluidized bed at such temperatures for from about 1 to about 8 hours until the reaction has been completed.

Any form of commercially available starch may be used in carrying out the present invention. For example, unmodified starch derived from corn, potato, wheat, sago, tapioca and arrowroot may be reacted with phosphate salts in accordance with the process. Also, modified starches such as oxidized starches, ether starches, anionic and cationic starches, and acid-treated thin boiling starches may be employed. In all cases, the starch to be treated should be in the form of ungelatinized granules.

As is conventional, the inorganic phosphate salts to be employed are the alkali metal phosphates, for example, sodium, potassium and lithium phosphates. The selected phosphate salt may be added in dry state to wet starch granules or the phosphate salt may be dissolved in water to form an aqueous solution which is mixed with the starch granules. The solution preferably contains from about 2.5% to 30% by weight of phosphate salt and the pH of the solution is preferably adjusted to about 7.0, if not already at that level, by addition of a more acidic or basic phosphate salt, or by addition of phosphoric acid or alkali metal hydroxide. Thus, aqueous solutions containing a plurality of phosphate salts as well as solutions containing a single salt may be used in preparing the starch granules for use in the process of the present invention. The phosphate salt may be either a mono, di or tri alkali metal phosphate or combinations thereof.

As described in the previously mentioned patents, the phosphate solution may be introduced into the starch granules by commingling the granules and solution to form a slurry. Generally, from about 1.5 to 2 parts of phosphate solution may be admixed with 1 part of starch to form a workable slurry and the slurry is stirred or agitated for a sufficient time so as to permit the starch granules to become soaked or impregnated with the phosphate solution. Usually from 5 to 10 minutes of contact between the starch and phosphate solution, with stirring, will be sufficient for impregnation, although the time may be extended up to an hour if desired.

The soaked starch granules are thereafter separated from excess unabsorbed phosphate solution by, for example, filtration, and the granules are then dried to the extent of not more than 20% moisture content in any conventional manner.

In accordance with the invention, reaction between the starch granules and the phosphate salt impregnated therein is carried out by forming a bed of the granules in a suitable vessel and then fluidizing the granules in a stream of hot inert gas and simultaneously heating them to reaction temperatures of from about 300° to 375° F. Any gas which is inert towards the starch and phosphate salt reactants may be used for fluidization. While the use of hot air is preferred for reasons of cost economy, nitrogen and similar inert gases may be employed also. The hot gas must be passed through the starch granules at a velocity high enough to fluidize them and the term fluidize, as used herein, is defined to mean that a substantial quantity of the starch granules are suspended in the stream of hot gas as shown by an increase in the volume of the starch bed caused by the movement of the gas stream through the bed. Generally speaking, it is preferred that the volume of the starch bed be increased by a factor of about 1.1 to about 1.5 where the fixed starch bed occupies a cylindrical volume about 6 inches in diameter and about 16 inches in height. For fixed starch beds of different volume, equivalent factors of volume increase are preferred, although none of these values is actually critical. The essential requirement is that a substantial proportion and preferably all of the granules in the fixed bed be lifted and suspended in the gas stream whereby the character of the bed is changed from the loosest possible fixed-bed configuration to one of true fluidization in which the individual granules are only in intermittent, if any, contact with each other. Established, well known principles in the art regarding fluidization of pulverulent solids generally will apply as to the conditions of gas flow required for achieving fluidization of beds of starch granules that are treated in accordance with this invention.

The temperature of the gas stream should be high enough so that at its velocity of movement sufficient heat will be transferred to the starch granules to raise their temperature to about 300° to 375° F. for the starch-phosphate salt reaction. In general, gas temperatures of about 400° to 450° F. are suitable although these values may be extended lower or higher depending on the velocity of the gas stream through the granules.

The reaction between the starch and phosphate salt in the fluidized granules generally will be completed in from about 1 to 8 hours. If the temperature of the starch granules is maintained at about 320° to 350° F., about 4 hours of heating is sufficient to complete the reaction.

For a better understanding of further details of the invention, reference will be made to the accompanying drawings of which:

Figure 1:
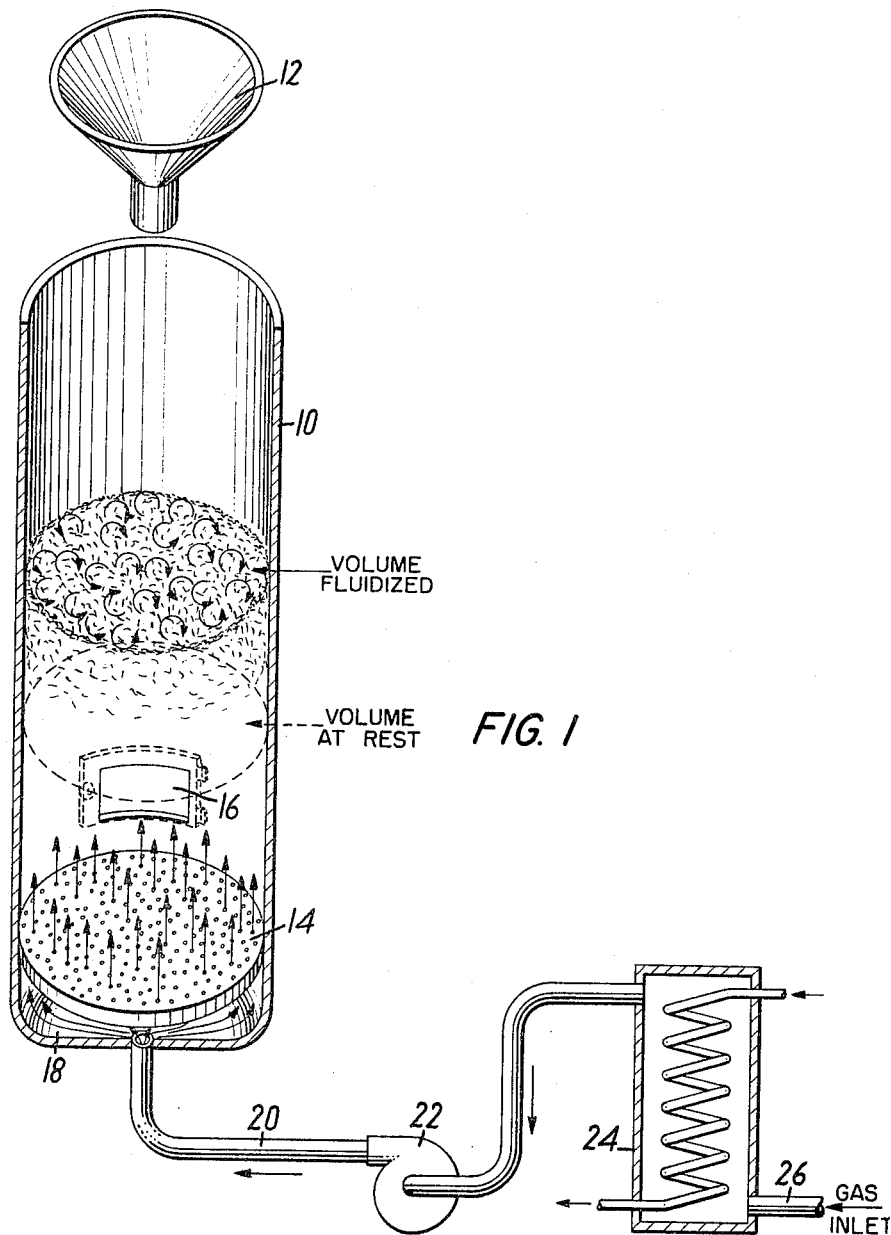
FIG. 1 is a view in elevation with parts in section of an apparatus suitable for carrying out the process of the invention for reacting starch and inorganic phosphate salts in batch quantities.

Referring to FIG. 1, the apparatus there illustrated includes an upright cylinder 10 having an open top. Positioned above the open top by suitable support means (not shown) is a feed hopper 12 for charging the cylinder 10 with starch granules. At the bottom of cylinder 10, there is a plate 14 having small openings distributed over its entire area. The plate 14 may be made of porous cement, or it may be sintered bronze plate, or a wire mesh having such openings as correspond to a 325 mesh Taylor sieve. A door 16, in the wall of the cylinder 10, is located just above the plate 14 and the door is gasketed to provide an air seal. Below the plate 14 there is a chamber 18 which is connected to pipe 20 leading to one side of blower 22. A heat exchange unit 24 is connected to the other side of the blower 22 for heating inert gas which enters the heat exchanger at 26.

In using the apparatus of FIG. 1, the cylinder 14 is filled with starch granules containing an inorganic phosphate salt through the feed hopper 12 to form a bed of the granules resting upon the porous plate 14. Preferably the cylinder is filled to ⅓ of its volume above the porous plate 14 and thereafter inert gas is heated by passage through exchanger 24 and forced into the chamber 18 by means of blower 22. The inert gas passes upwardly through the openings of the plate 14, through the starch granules resting on the plate and finally discharges out from the open top of cylinder 10. The velocity of the gas stream is such that the starch granules are fluidized, that is to say, the granules are suspended in a volume which is greater than the volume of the starch granule bed at rest. In this particular form of apparatus, the degree of fluidization is controlled to prevent the level of the suspended granules from reaching the top of cylinder 10. If desired, the top of the cylinder may be closed off and connected to a conventional cyclone separator to remove fines and dust which may be entrained in the gas stream. The door 16 permits removal of the starch phosphate reaction product after the reaction has been completed.

Figure 2:
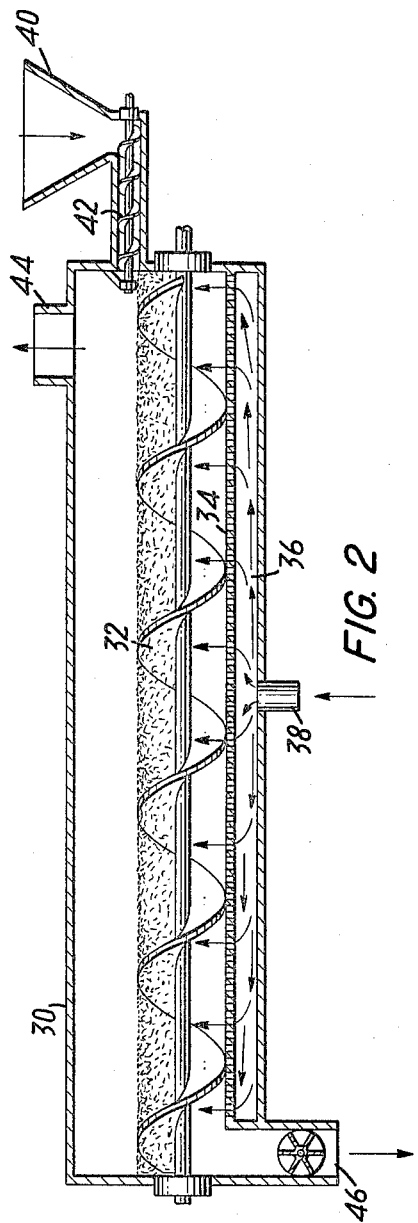
FIG. 2 is a similar view of another form of apparatus suitable for carrying out the process of the invention continuously.

FIG. 2 illustrates a second form of apparatus in which starch and inorganic phosphate salts may be reacted continuously by the fluidization process of the invention. This apparatus includes a horizontally-positioned reaction vessel 30 which contains a screw conveyer 32 in the interior thereof. Immediately below the conveyor 32 is a porous plate 34 similar to the plate 14 of FIG. 1. Below the plate 34 there is a chamber 36 which extends along the entire bottom of the plate 34. The inlet 38 leads into the center of chamber 36. A feed hopper 40, discharging into conveyer 42, provides means for charging starch granules into one end of the vessel 30. In the top wall of this end of the vessel 30, there is positioned an exit opening 44 for the hot gas stream. At the opposite end of vessel product exit 30 is provided for discharge of the starch phosphate reaction product.

In using the apparatus in FIG. 2, starch phosphate granules containing an inorganic phosphate salt are charged into the vessel 30 to form a bed upon plate 34, and hot inert gas is passed up through plate 34 at a rate sufficient to fluidize the starch granules. The granules are caused to move towards the product exit 46 by the conveyer 32 and the speed of rotation of the conveyer 32 is controlled to give the starch granules sufficient residence time in the vessel 30 for the reaction with the phosphate salt to be completed. With the exception of the exit 44, the remaining openings leading into and out from the the vessel 30 are air locked to prevent loss of air. Furthermore the fluidized volume of the granules may again be controlled in the manner described in FIG. 1 to prevent the granules from reaching the opening of the exit 44.

Figure 3:
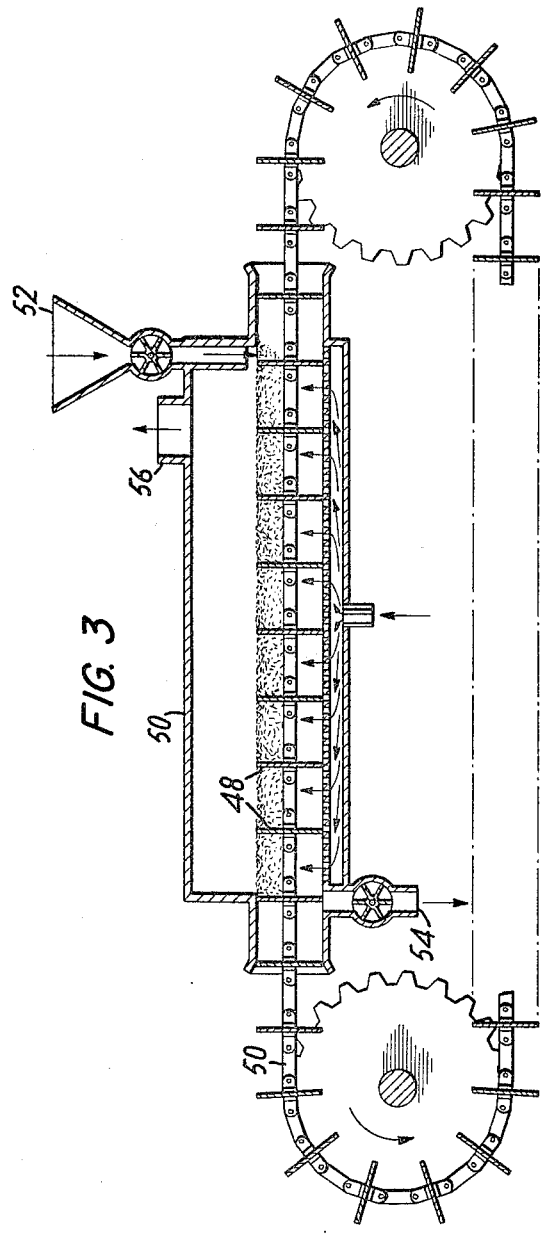
FIG. 3 is a similar view of still another form of apparatus for carrying out the process of the invention continuously.

The apparatus of FIG. 3 is similar to the one of FIG. 2 except that flights 48 are substituted for the screw conveyer 32. The flights 48 travel on an endless belt 50 from one end of the vessel 50 to the other. The feed hopper 52 is positioned at the end of the vessel 50 into which the flights 48 enter so that the fluidized granules are slowly moved towards the product exit opening 54. As with the apparatus of FIG. 2, all openings leading into and out from vessel 50, with the exception of the air exit 56, are air locked to prevent loss of air.

It will be obvious that in the apparatus shown in FIGS. 2 and 3, the reaction between starch granules and inorganic phosphate salt may be carried out continuously while the apparatus of FIG. 1 is suitable for carrying out the reaction in batch quantities.

*Example 1*

As a specific example of the process of the invention, the following description of a test carried out in an apparatus similar to the one illustrated in FIG. 1 is given.

In this example, the diameter of the upright cylinder used was about 6 inches and the length of the cylinder was about 48 inches. The bottom of the cylinder included a sintered bronze plate having openings distributed over its entire area. Sufficient corn starch granules to fill ⅓ of the volume of the cylinder were slurried at room temperature in an aqueous solution of sodium phosphate containing about 8% by weight of the phosphate salt and having a pH of about 7.0 Approximately two parts of the phosphate solution was mixed with each part of starch granules and the slurry was stirred for about 15 minutes. Thereafter, the swollen granules were filtered and thereby separated from the excess unabsorbed solution, and the granules were air dried to a moisture content of about 11% by weight. The granules were placed in the cylinder and air at a temperature of about 420° F. was passed up through the porous plate and through the starch granules. The velocity of the air stream was about 35 ft.$^3$/sec. and the volume of the granules increased from the original volume by a factor of about 1.3. The granules reached a temperature of 335° F. shortly after the start of fluidization and the granules remained at that temperature throughout the remainder of the reaction.

After 2 hours, when reaction was completed, fluidization was discontinued and the starch phosphate granules were removed from the cylinder. A sample of the product was dissolved in water to form a 5% aqueous solution by weight. The viscosity of this solution was determined at room temperature using a Brookfield viscometer with a No. 4 spindle rotating at 6 r.p.m. The viscosity was measured to be 97,000 cps.

Another batch of corn starch granules was reacted with sodium phosphate using the same ingredients, concentrations, reaction temperature and reaction time except that the granules were heated to reaction temperature and held in a steam jacketed kettle under mechanical agitation in conventional manner. A sample of this product was also dissolved in water to form a 5% aqueous solution and the viscosity of this solution at room temperature was only 32,000 cps.

*Example 2*

In this run, a starch phosphate reaction product was prepared by fluidization using relatively high starch granule temperatures. A flow of hot air was started through an apparatus of the type illustrated in FIG. 1, and ½ hour later 5 pounds of starch granules containing impregnated alkali metal phosphate salt like those used in Example 1 were added to the apparatus. The air flow temperature at this time was 395° F. and at a velocity sufficient to fluidize the starch granules.

¼ hour after addition of the granules, the granule temperature was 320° F. and the gas temperature 390° F. Two hours after the starch granules were added, a sample of the reaction product was withdrawn, with the starch granules having reached a temperature of 345° F. and the air flow temperature being 400° F. The viscosity of a 5% aqueous solution of this sample was 35,000 cps. measured in the manner described in Example 1. 2¾ hours after addition of the starch granules, another sample was withdrawn with the starch granules having reached a temperature of 365° F. and the air flow temperature being 402° F. The viscosity of the second sample in a 5% aqueous solution was over 100,000 cps.

This run could be summarized as 2 hours reaction time required to reach 35,000 cps. viscosity and 2¾ hours required to reach 100,000 cps. viscosity, using inlet air flow temperatures of from 390° to 402° F.

*Example 3*

In this run, the process was initiated with a cold bed of starch granules. Five pounds of the phosphate-impregnated starch granules of Example 1 were placed in the apparatus shown in FIG. 1 and a flow of hot air was started through the bed of granules at a velocity sufficient to fluidize the same. One hour and 55 minutes later a sample of the reaction product was withdrawn, with the starch granule temperature having reached 345° F. and the air flow temperature being 400° F. A 5% aqueous solution of this sample had a viscosity of 66,000 cps. Two and ¼ hours after the start of the run, a second sample was withdrawn with the starch granules and air flow temperature being the same as at the time of withdrawal of the first sample. A 5% aqueous solution of the second sample had a viscosity of 100,000 cps.

This run could be summarized as 1 hour and 55 minutes required to reach 66,000 cps. viscosity and 2¼ hours required to reach 100,000 cps. viscosity, using inlet air flow temperatures of 400 to 410° F.

*Example 4*

In this run, a larger quantity of starch granules was fluidized for reaction in accordance with the invention. A flow of hot air was started through an empty apparatus of the type shown in FIG. 1 of the drawings. Two and ½ hours later 10 pounds of the phosphate-impregnated starch granules of Example 1 were added to the apparatus and were fluidized in the hot air stream. One and ¾ hours after this addition, a sample of the reaction product was withdrawn, with the starch granules having reached a temperature of 340° F. and the air flow temperature being 394° F. The viscosity of a 5% aqueous solution of this sample was measured in the manner previously described and the value was 50,000 cps. One-half hour after withdrawal of the first sample, a second sample was withdrawn, with the temperature of the granules having decreased to 325° F. and the air flow temperature having increased to 400° F. The viscosity of a 5% aqueous solution of the second sample was 100,000 cps.

This run can be summarized as 1¾ hours reaction time required to reach a 50,000 cps. viscosity and 2¼ hours reaction time required to reach a 100,000 cps viscosity, using inlet air flow temperatures of 394° to 415° F.

*Example 5*

In this run, a relatively short reaction time was used to prepared starch phosphate reaction product by fluidization. Five pounds of the phosphate-impregnated starch granules of Example 1 were added to and fluidized in the apparatus used in the previous example, a flow of hot air having been started through the apparatus for 2 hours prior to the addition. One hour after the addition of starch granules, a sample was withdrawn, with the starch granule temperature being 350° F. and the air flow temperature 470° F. The viscosity of a 5% aqueous solution of this sample was 50,000 cps. Exactly 7 minutes after the first sample was withdrawn, a second sample was taken with the starch granule temperature being the same and the air temperature having dropped to 430° F. The viscosity of a 5% aqueous solution of the second sample was 100,000 cps.

Accordingly, this run could be summarized as one hour reaction time required to reach a 50,000 cps. viscosity and 1 hour 7 minutes reaction time required to reach the 100,000 cps. viscosity, using inlet air flow temperatures of 400° to 470° F.

These results illustrate that the process of fluidizing starch granules containing an inorganic phosphate salt and heating them to reaction temperatures in some unknown manner leads to the formation of starch phosphate products having unexpectedly superior characteristics. In particular, there is no present explanation for the fact that the viscosity-to-solids ratios provided by the starch phosphate products prepared in the manner of the invention are so markedly lower than for starch phosphate products formed by conventional manufacture when essentially the same process variables are employed. For this reason, it is thought that the starch-phosphate salt reaction proceeds in some entirely new manner when carried out in accordance with the method of this invention.

While the foregoing description relates to fluidization of dry granules containing not more than 20% moisture, starch granules containing higher moisture levels can be charged to the fluidization vessel and the temperature and velocity of the fluidizing gas controlled to expel moisture from the granules without raising their temperature to the high reaction temperatures, whereby the granules may be dried to the 20% level or below as an incident to carrying out the method of our invention and thereafter the starch granules may be fluidized at high temperatures for reaction with the phosphate salt in accordance with the invention.

It will be understood that it is intended to cover all changes and modifications of the preferred embodiments of the invention, herein chosen for the purpose of illustration, which do not constitute departures from the spirit and scope of the invention.

What is claimed is:

1. In a process of reacting starch with an inorganic phosphate salt by heating starch granules containing at least one absorbed alkali metal phosphate salt and not more than 20% by weight of moisture, the steps which comprise passing a stream of hot inert gas through a bed of said starch granules at a velocity sufficient to fluidize and heat said granules to reaction temperatures and maintaining said granules in the fluidized and heated state until the desired reaction between the starch and phosphate salt is completed.

2. The process in accordance with claim 1 in which the starch granules are maintained in the fluidized and heated state for about 1 to about 8 hours.

3. In a process of reacting starch with an inorganic phosphate salt by heating starch granules containing at least one absorbed alkali metal prosphate salt and not more than 20% by weight of moisture, the steps which comprise forming a bed of said starch granules, heating a stream of air to elevated temperatures, passing the stream of heated air through said starch granules at a velocity sufficient to increase the volume of said granules and suspend a substantial quantity thereof in said air stream, and simultaneously heating said granules by means of said heated air stream to a temperature of about 300° to about 375° F., and maintaining said granules in the suspended and heated state for about 1 to about 8 hours.

4. The process in accordance with claim 3 in which the air is heated to a temperature of about 400° to about 450° F.

5. The process in accordance with claim 3 in which the heated air is passed through said granules at a velocity of about 30 to 35 ft. ³/sec.

6. The process in accordance with claim 3 in which the volume of said granules is increased by a factor of about 1.1 to about 1.5.

7. In a process of reacting starch with an inorganic phosphate salt by heating starch granules containing at least one absorbed alkali metal phosphate salt and not more than 20% by weight of moisture, the steps which comprise continuously charging said granules into a fluidization zone, passing a stream of hot inert gas through said granules at a velocity sufficient to increase the volume of said granules within said fluidization zone, continuously heating said granules by means of said hot inert gas stream to a temperature of about 300° to about 375° F., maintaining said granules in the fluidized and heated state within said fluidization zone for about 1 to about 8 hours, and continuously moving said granules out of the fluidization zone.

8. The process in accordance with claim 7 in which said starch granules are charged into one end of the fluidization zone and continuously moved toward the opposite end of said zone, the time of travel from the one end to the opposite end of said zone being controlled to about 1 to about 8 hours.

9. In a process for reacting starch with an inorganic phosphate salt by starch granules containing at least one absorbed alkali metal phosphate salt, the steps which comprise forming a bed of said starch granules, passing a stream of hot inert gas through said starch granules at a velocity and temperature sufficient to expel moisture from said granules but insufficient to raise the temperature thereof to 300° F., continuing said passage of hot inert gas until the moisture contained in said granules is not more than 20% by weight thereof, then fluidizing and simultaneously raising the temperature of said granules to about 300° to about 375° F. in said hot gas stream and maintaining said granules in the fluidized and heated state at said temperatures for about 1 to about 8 hours.

References Cited by the Examiner
UNITED STATES PATENTS

| | | | |
|---|---|---|---|
| 2,421,212 | 5/1947 | Medlin | 196—52 |
| 2,865,762 | 12/1958 | Neukom | 99—139 |

LEON J. BERCOVITZ, *Primary Examiner.*

R. W. MULCAHY, *Assistant Examiner.*

UNITED STATES PATENT OFFICE
CERTIFICATE OF CORRECTION

Patent No. 3,284,443                                  November 8, 1966

Julian A. Hay et al.

It is hereby certified that error appears in the above numbered patent requiring correction and that the said Letters Patent should read as corrected below.

Column 8, line 3, for "contnuously" read -- continuously --; line 17, before "starch" insert -- heating --.

Signed and sealed this 12th day of September 1967.

(SEAL)
Attest:

ERNEST W. SWIDER                              EDWARD J. BRENNER
Attesting Officer                                 Commissioner of Patents